UNITED STATES PATENT OFFICE.

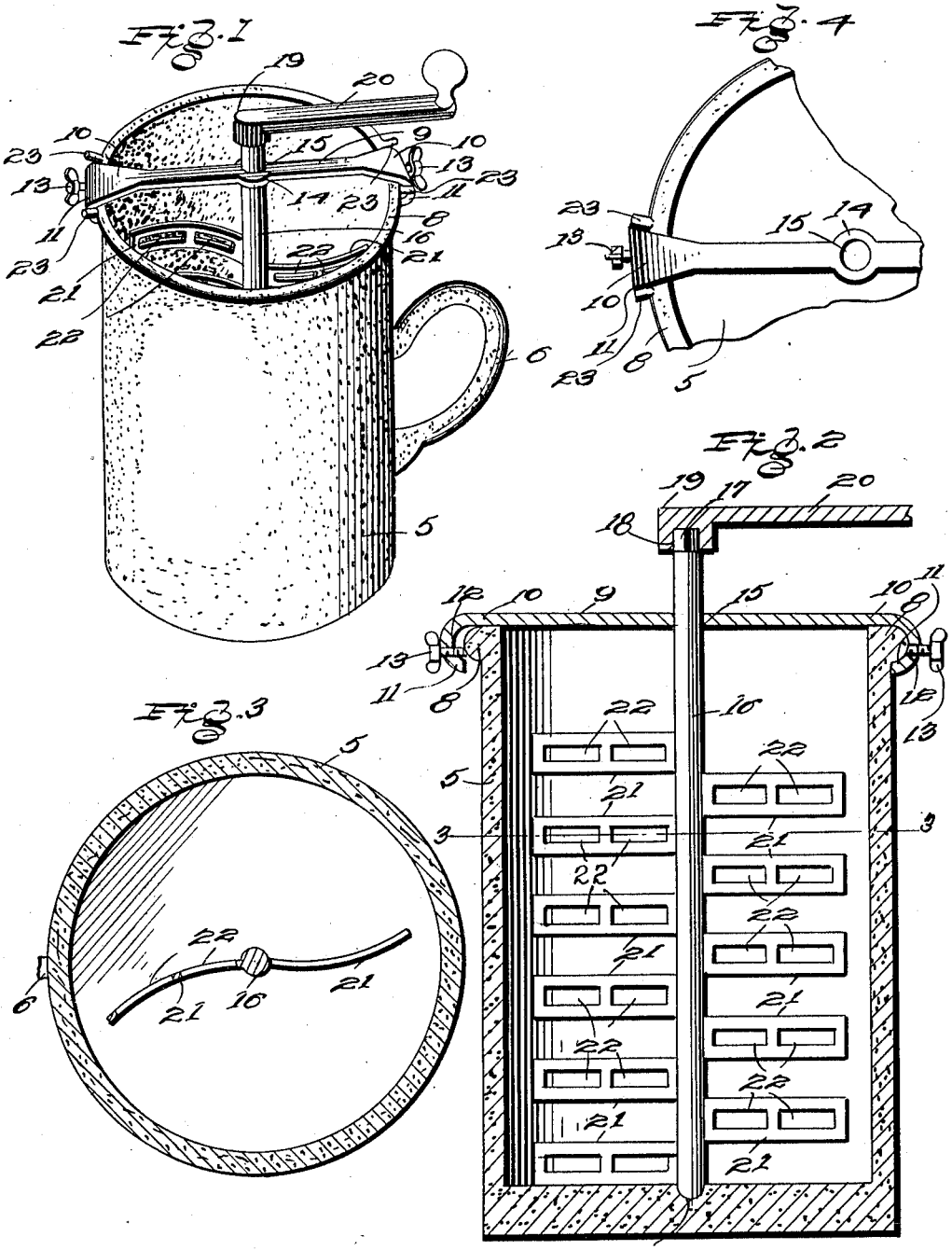

MAHALAH T. HUDSON, OF ENID, OKLAHOMA.

COMBINED CAKE-MIXER AND EGG-BEATER.

1,026,355.              Specification of Letters Patent.        Patented May 14, 1912.

Application filed May 24, 1911. Serial No. 629,157.

*To all whom it may concern:*

Be it known that I, MAHALAH T. HUDSON, a citizen of the United States, residing at Enid, in the county of Garfield and State of Oklahoma, have invented certain new and useful Improvements in Combined Cake-Mixers and Egg-Beaters, of which the following is a specification, reference being had therein to the accompanying drawing.

This invention relates to mixers and beaters for use in connection with the mixing of ingredients for cakes, for beating eggs, and many other culinary uses, and the principal object of the same is to provide a device of the character stated in which the parts can be separated to permit the same to be thoroughly cleaned, and also to provide simple means for supporting a plurality of dashers in a receptacle and means for rotating the dashers so that they will effectively act upon the contents of said receptacle.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a perspective view of the improved mixer and beater. Fig. 2 is an enlarged central vertical sectional view thereof. Fig. 3 is a transverse sectional view taken on the line 3—3, Fig. 2. Fig. 4 is a fragmentary top plan view, the dasher shaft and dashers being omitted.

Referring to the accompanying drawings by numerals, it will be seen that the improved mixer and beater comprises a receptacle 5 which may be in the form of a cup and provided with a handle 6. The receptacle may be of plastic material, metal, or any other suitable material and is enameled or otherwise treated to smooth the surfaces thereof so that the receptacle can be readily and thoroughly cleaned. The bottom of the receptacle 5 is preferably thickened and is provided with a centrally located bearing recess 7. The open upper end of the receptacle 5 is surrounded by an external lip or flange 8 that is preferably rounded.

A flat supporting bar 9 extends across the open upper end of receptacle 5 and has enlarged ends 10 provided with downturned gripping flanges 11 for interlocking engagement with opposite portions of the lip or flange 8. The gripping flanges 11 are provided with threaded transverse openings 12 through which set screws 13 extend for detachably locking the bar 9 to the lip 8. The enlarged central portion 14 of bar 9 is provided with a bearing opening 15 that is in alinement with the base recess 7 of the receptacle 5. A dasher shaft 16 extends through the bearing opening 15 and its lower end is seated in recess 7. The upper end of shaft 16 projects well above bar 9 and has a squared portion 17 that is fitted in a similarly shaped socket 18 formed in the head 19 of a hand lever 20. Within the receptacle 5, shaft 16 is provided with vertical rows of horizontally arranged dashers 21 which are preferably integral with the shaft 16 and arranged in staggered relation. The dashers 21 are slightly bowed, and each is provided with a pair of elongated slots 22.

It will be observed that each of the blades or dashers 21 is rectangular in elevation as can be seen by reference to Fig. 2. It will also be noted that the side faces are vertical and that the slots of these blades or dashers are in alinement and rectangular. Furthermore, by reason of being rectangular the blades are parallel at their upper and lower edges. It will also be noted that spaces between adjacent blades on one side of the rod are equal to the width of the blades on the opposite side of the rod so that the bottom part of each blade is alined with the top edge of the blade on the opposite side of the rod next adjacent thereto. By reason of this construction the peculiar disposition and size of the blades with respect to the spaces between them causes the entire mass to be effectively kneaded or beaten since the blades on one side of the rod 16 completely fill the place between the blades on the other side of said rod and the rod adjacent.

Lip 18 is provided with oppositely disposed laterally projecting pairs of lugs 23 between the members of which the ends 10 of the bar 9 are fitted when engaged with said lip, said lugs obviously preventing rotary movements of the bar 9 relative to said lip.

It will be clear from the foregoing that by rotating hand lever 20 the dasher shaft and dashers will be similarly actuated, and said dashers being bowed and slotted, it will be readily understood that the contents of the receptacle 5 will be thoroughly mixed or beaten. It will also be seen that the hand lever 20 can be separated from the dasher shaft 16, the bar 9 removed from the receptacle 5, and the said bar 9 removed from the said shaft 16, so that access can be had to all of said parts as well as the receptacle 5, to permit the same to be thoroughly cleaned.

What I claim as my invention is:—

In a device of the kind described, a dasher element consisting of a central rod and blades projecting from the outside of said rod, each of said blades being rectangular in elevation and provided with vertical side faces, each of said blades being further provided with a plurality of alined rectangular slots, each of said blades further having parallel upper and lower edges, said blades being in staggered relation and the spaces between adjacent blades on one side of said rod being equal to the width of the blades on the opposite side of said rod, the bottom edge of each blade being alined with the top edge of the blade on the opposite side of the rod next adjacent.

In testimony whereof I hereunto affix my signature in presence of two witnesses.

MAHALAH T. HUDSON.

Witnesses:
 A. B. PYLE,
 T. M. CRUMP.

---

Copies of this patent may be obtained for five cents each, by addressing the "Commissioner of Patents, Washington, D. C."